US007254522B2

(12) United States Patent
Tsalakopoulos (10) Patent No.: US 7,254,522 B2
(45) Date of Patent: Aug. 7, 2007

(54) APPARATUS AND METHOD FOR DETERMINING A LEVEL OF CONFIDENCE IN A RISK ASSESSMENT AND/OR DETERMINING A LEVEL OF ACCEPTABILITY OF AN EVENT OCCURRING

(75) Inventor: Chris Tsalakopoulos, Toorak (AU)

(73) Assignee: Metatheme Pty Ltd, Toorak, Victoria (AU)

( * ) Notice: Subject to any disclaimer, the term of this patent is extended or adjusted under 35 U.S.C. 154(b) by 0 days.

(21) Appl. No.: 10/534,157

(22) PCT Filed: Nov. 20, 2003

(86) PCT No.: PCT/AU03/01556

§ 371 (c)(1),
(2), (4) Date: Aug. 30, 2005

(87) PCT Pub. No.: WO2004/046976

PCT Pub. Date: Jun. 3, 2004

(65) Prior Publication Data

US 2006/0149501 A1 Jul. 6, 2006

(30) Foreign Application Priority Data

Nov. 20, 2002 (AU) ............................. 2002952784

(51) Int. Cl.
*G06F 19/00* (2006.01)
(52) U.S. Cl. ........................................ 702/194; 714/25
(58) Field of Classification Search .............. 702/194, 702/193, 182–185, 188; 714/25
See application file for complete search history.

(56) References Cited

U.S. PATENT DOCUMENTS

| 5,999,918 A | 12/1999 | Williams et al. |
|---|---|---|
| 6,219,805 B1 | 4/2001 | Jones et al. |
| 6,223,143 B1 | 4/2001 | Weinstock et al. |
| 6,353,767 B1 * | 3/2002 | Wakeman et al. ............ 700/91 |

FOREIGN PATENT DOCUMENTS

WO    WO 98/13776    2/1998

OTHER PUBLICATIONS

Felter, S. et al. "The Inexact Science of Risk Assessment (and Implications for Risk Management)" Human and Ecological Risk Assessment: 1998 Vo. 4, No. 2 pp. 245-251 p. 248.

* cited by examiner

*Primary Examiner*—Edward Raymond
(74) *Attorney, Agent, or Firm*—Ladas & Parry LLP (57) ABSTRACT

An apparatus (1) for assisting a user in determining a level of confidence in a risk assessment, the apparatus comprising: input means (3) for receiving at least one of a set of factors each of which can affect the level of confidence in the risk assessment; storage means (5) for storing the set of factors and a set of weighting indicators, wherein each factor within the set of factors is associated with a weighting indicator from the set of weighting indicators; processing means (7) for processing the at least one of the set of factors entered into the input means (3) and processing the set of factors stored in the storage means (3) in order to identify a factor in the set of factors which corresponds to the at least one factor entered into the input means (3); and output means (9) for outputting the set of weighting indicators and the weighting indicator associated with the factor identified by the processing means (7).

37 Claims, 11 Drawing Sheets

| ENVIROMENT | IDENTIFIER |
|---|---|
| Simple | 1e |
| Low-moderate | 2e |
| High-moderate | 3e |
| Complex | 4e |

Factor 1: Enviroment

| Simple |
| --- |
| Low-Moderate |
| Moderate |
| High-Moderate |
| Complex |

Factor 2: Work Type

| Basic |
| --- |
| Moderate |

Factor 3: Work Extend (applies only to "technical program' sub-factor )

| Basic |
| --- |
| Moderate |
| Extensive |

Factor 4: Work Acceptance

| Simple View |
| --- |
| Small group view |
| Large group view |
| Widely accepted |

Metatheme Forward Terrain™ System - Mozilla Firefox

File  Edit  View  Go  Bookmarks  Tools  Help http://metatheme/index.cfm

Metatheme Forward Terrain™ System

Logout | User (bob) | Help | Print

| Navigation | |
|---|---|
| Home | Risk Node Folder — Flight Provision Disruption..... ( RSK - 95 ) |
| Browse My | Summary | Timeframe | Framework | Treatment Links | Notices | Reports | Administration |
| Search | Risk Node > Condition Links > Condition Values |
| - Risk Nodes | ( View Condition ) |
| - Conditions | Manage Condition Values |
| - Treatments | Provisiong Assessments (CON-35) |
| - Treatment Projects | ( Add Impact ) |
| ADVANCED SEARCH | Impacts (Fixed) |
| CREATE NEW | 2 Items |
| REPORTS | |
| APPROVAL | |
| ADMINISTRATION | |
| HELP | |

| Impact | Value | Upper Value | Lower Value | Period | | |
|---|---|---|---|---|---|---|
| Financial Cost | AUD $900,000 | +AUD $150,000 | -AUD $150,000 | n/a | Delete | Edit |
| Reputation | Level 4 ( 1 - 7 ) | n/a | n/a | n/a | Delete | Edit |

Page 1 of 1

( Edit Likelihood ) ( Edit Confidence Score ) ( Transparency Information Completed ) )

Condition Rating

| | | Rating | Likelihoods Range % | Confidence Score Range |
|---|---|---|---|---|
| | High Caution | Extreme | 70 - 100 | 5 - 10 |
| | | High Caution | 50 - 70 | 1 - 10 |
| Generated By: | | Low Caution | 20 - 50 | 1 - 10 |
| 50% | Likelihood ( No Period Frequency ) | Acceptable | 0 - 20 | 5 - 10 |
| 4 | Confidence Score ( 1 - 10 ) | | | |

Linked Condition Attachments: ( Manage )
Report analysis.doc — section 5
Assessment Results.doc — pages 10 - 14

Extended Information Attachments: ( Upload New Attachment )
0 Items

Page 1 of 10

APPARATUS AND METHOD FOR DETERMINING A LEVEL OF CONFIDENCE IN A RISK ASSESSMENT AND/OR DETERMINING A LEVEL OF ACCEPTABILITY OF AN EVENT OCCURRING

FIELD OF THE INVENTION

The present invention relates to an apparatus and method for assisting a user in determining a level of confidence in a risk assessment and/or assisting the user in determining a level of acceptability of an event occurring.

BACKGROUND OF THE INVENTION

Risk is something which we all encounter in our everyday lives. For example, we risk being involved in an accident whenever we travel in a motor vehicle. Generally speaking, risk can be defined as the likelihood of some event occurring by the impact or consequences of that event; that is, risk=likelihood*impact.

A great deal of research has been undertaken in order to develop techniques for determining risk. Some of the more common techniques include: statistical analysis; forward simulations; mathematical modelling; and judgement or guessing. The problem with existing techniques for determining risk is that they do not take into account the validity of the information or process used to derive the risk. For example, where risk is determined using statistical analysis (of sampled data) the validity of the risk calculation (that is, the level of confidence a person can have in the risk calculation) will depend to some degree on the number of data samples used in the statistical analysis. Where only a few samples are taken the validity of the risk would be lower than if the risk were derived using a large number of samples.

Unfortunately, existing methods do not provide any indication as to the validity of a risk calculation. Consequently, a person using the risk calculation is unable to determine just how much confidence he/she can have in the calculated risk. This can be detrimental if, for example, a person has too much confidence in a risk calculation which is based on statistical analysis using only a few data samples (a low validity).

Existing techniques for determining risk assessment also do not give any indication as to the level of acceptability of the event occurring.

SUMMARY OF THE INVENTION

According to a first aspect of the present invention there is provided an apparatus for assisting a user in determining a level of confidence in a risk assessment, the apparatus comprising:

input means for receiving at least one of a set of factors each of which can affect the level of confidence in the risk assessment;

storage means for storing the set of factors and a set of weighting indicators, wherein each factor within the set of factors is associated with a weighting indicator from the set of weighting indicators;

processing means for processing the at least one of the set of factors entered into the input means and processing the set of factors stored in the storage means in order to identify a factor in the set of factors which corresponds to the at least one factor entered into the input means; and output means for outputting the set of weighting indicators and the weighting indicator associated with the factor identified by the processing means.

Thus, the information output by the output means can assist the user in determining the level of acceptance in the risk assessment. The set of weighting factors provide a context against which the weighting indicator associated with the factor identified by the processing means can be assessed.

Preferably, the set of factors comprises: information about a technique used to obtain the risk assessment; the extent to which the technique is used to obtain the risk assessment; a level of acceptance of the technique and extent to which the technique is used to obtain the risk assessment; and information about the environment of the risk assessment.

Preferably, the set of weighting indicators and the set of factors are arranged as a matrix, wherein the set of weighting indicators are entries in the matrix and the set of factors provide an index to the entries.

Thus, by acting as an index to the entries, each of the set of factors is associated with a weighting indicator.

Preferably, each of the set of factors providing the index to the entries in the matrix are divided into sub-factors.

Preferably, the set of factors providing the index to the entries in the matrix comprises: the information about the environment of the risk assessment; information about techniques used to perform the risk assessment; an extent to which the technique is used to obtain the risk assessment; and a level of acceptance of the technique the extent to which the technique is used to obtain the risk assessment.

Preferably, the sub-factors for the environment of the risk assessment comprises: simple; low; moderate; high moderate; and complex.

Preferably, the sub-factors for the extent to which the technique is used comprises: basic; moderate; and extensive.

Preferably, the input means allows the user to enter and/or change the set of factors and the set of weighting indicators.

Preferably, the input means is capable of storing in the storage means the set of factors and the set of weighting indicators entered into the input means.

Preferably, the input means comprises a graphical user interface.

Preferably, the storage means comprises a computer storage medium.

Preferably, the computer storage medium comprises a database.

Preferably, the processing means comprises a suitably configured computer.

Preferably, the output means comprises a graphical user interface.

Alternatively, other forms of computer presentation devices can be used as the output means. For example, the output means could be a printer.

According to a second aspect of the present invention there is provided a method for assisting a user in determining a level of confidence in a risk assessment, the method comprises the steps of:

entering into an input means at least one of a set of factors each of which can affect the level of confidence in the risk assessment;

storing in a storage medium the set of factors and a set of weighting indicators, wherein each factor within the set of factors is associated with a weighting indicator from the set of weighting indicators;

processing the at least one of the set of factors entered into the input means and processing the set of factors stored in the storage means in order to identify a factor in the set of factors which corresponds to the at least one factor entered into the input means; and outputting the set of weighting indicators and the weighting indicator associated with the factor identified by the processing step.

Thus, the information output by the output means can assist the user in determining the level of acceptance in the risk assessment. The set of weighting factors provides a context against which the weighting indicator associated with the factor identified by the processing means can be assessed.

Preferably, the method further comprises the step of arranging the set of factors as a matrix, wherein the set of weighting indicators are entries in the matrix and the set of factors provide an index to the entries.

Thus, by acting as an index to the entries, each of the set of factors is associated with a weighting indicator.

Preferably, the method further comprises the step of entering and/or changing the set of factors and the set of weighting indicators entered into the input means.

According to a third aspect of the present invention, there is provided an apparatus for assisting a user in determining a level of acceptability of an event occurring, the apparatus including:

input means for receiving a likelihood value which represents a likelihood that the event will occur, and a confidence value which represents a level of confidence that the user has in the likelihood value;

storage means for storing a plurality of records each of which includes an indicator representing a level of acceptability of the event occurring, a range of likelihood values, and a range of confidence values;

identify means for identifying one of the records in the storage means, the one of the records being identified by processing the likelihood value and the confidence value received by the input means, and each of the records stored in the storage means; and output means for outputting the indicator of the one of the records identified by the identifying means.

Thus, by outputting the indicator the user can determine the level of acceptability of the risk assessment.

Preferably, the range of confidence values of the record identified by the identify means comprises the confidence value received by the input means, and the range of likelihood values of the record identified by the identify means either comprises the likelihood value received by the input means or is numerically closer to the likelihood value received by the input means than the range of likelihood values of any other of the records for which the range of confidence values comprise the confidence value received by the input means.

Preferably, the indicator in each of the records is a visual indicator each being a different colour or symbol.

Preferably, the range of likelihood values in each of the records comprises a range of probability values.

Preferably, the range of confidence values in each of the records comprises a range of integers.

Preferably, the input means is configured to allow the user to enter and/or change the range of likelihood values and/or range of confidence values in each of the records.

Preferably, the input means comprises a graphical user interface.

Preferably, the storage means comprises a computer storage medium.

Preferably, the computer storage medium comprises a database.

Preferably, the identify means comprises a suitably configured computer.

Preferably, the output means comprises a graphical user interface.

Alternatively, other forms of computer presentation devices can be used as the output means. For example, the output means could be a printer.

According to a fourth aspect of the present invention, there is provided a method for assisting a user in determining a level of acceptability of an event occurring, the method comprising the steps of:

receiving a likelihood value which represents a likelihood that the event will occur, and a confidence value which represents a level of confidence that the user has in the likelihood value;

storing a plurality of records each of which includes an indicator representing a level of acceptability of the event occurring, a range of likelihood values, and a range of confidence values;

identifying one of the records stored by the storing step, the one of the records being identified by processing the likelihood value and the confidence value received by the receiving step, and each of the records stored by the storing step; and outputting the indicator of the one of the records identified by the identifying step.

Thus, by outputting the indicator the user can determine the level of acceptability of the risk assessment.

Preferably, the range of confidence values of the record identified by the identifying step comprises the confidence value received by the receiving step, and the range of likelihood values of the record identified by the identifying step either comprises the likelihood value received by the input means or is numerically closer to the likelihood value received by the receiving step than the range of likelihood values of any other of the records for which the range of confidence values comprises the confidence value received by the input means.

Preferably, the method further comprises the step of entering and/or changing the range of likelihood values and/or range of confidence values in each of the records.

According to a fifth aspect of the present invention, there is provided an apparatus for determining a level of confidence in a risk assessment, the apparatus comprising:

obtaining means operable to obtain a weighting that is associated with at least one of a plurality of factors that can influence a reliability of the risk assessment; and comparing means operable to compare the weighting to a range of weightings which are associated with the factors in order to determine the level of confidence in the risk assessment.

Preferably, the obtaining means is such that it uses the at least one of the factors to retrieve the weighting from a record of the weightings.

Preferably, the obtaining means is operable to retrieve the weighting from the record by using a first index and a second index to retrieve the weighting from the record, wherein the first index corresponds to a first of the at least one of the factors, and the second index corresponds to a second and a third of the at least one of the factors.

Preferably, the first of the at least one of the factors relates to an environmental parameter associated with the risk assessment, the second of the at least one of the factors relates to an extent of work performed to determine the risk assessment, and the third of the at least one of the factors relates to a level of acceptance associated with the amount of work performed and a technique used to perform the work.

Preferably, the record comprises a matrix that contains an entry for each of the weightings, and the first index and the second index correspond to an x, y coordinate for the entry.

According to a sixth aspect of the present invention, there is provided a method of determining a level of confidence in a risk assessment, the method comprising the steps of:

obtaining a weighting that is associated with at least one of a plurality of factors that can influence a reliability of the risk assessment; and comparing the weighting to a range of weightings which are associated with the factors in order to determine the level of confidence in the risk assessment.

Preferably, the step of obtaining the weighting comprises using the at least one of the factors to retrieve the weighting from a record of the weightings.

Preferably, the step of using the at least one of the factors to retrieve the weighting comprises the step of using a first index and a second index to retrieve the weighting from the record, wherein the first index corresponds to a first of the at least one of the factors, and the second index corresponds to a second and a third of the at least one of the factors.

Preferably, the first of the at least one of the factors relates to an environmental parameter associated with the risk assessment, the second of the at least one of the factors relates to an extent of work performed to determine the risk assessment, and the third of the at least one of the factors relates to a level of acceptance associated with the amount of work performed and a technique used to perform the work.

Preferably, the record comprises a matrix that contains an entry for each of the weightings, and the first index and the second index correspond to an x, y coordinate for the entry.

BRIEF DESCRIPTION OF THE DRAWINGS

Notwithstanding any other embodiments which may fall within the scope of the present invention, an embodiment of the present invention will now be described, by way of example only, with reference to the accompanying figures, in which.

AN EMBODIMENT OF THE INVENTION

Figure 1:
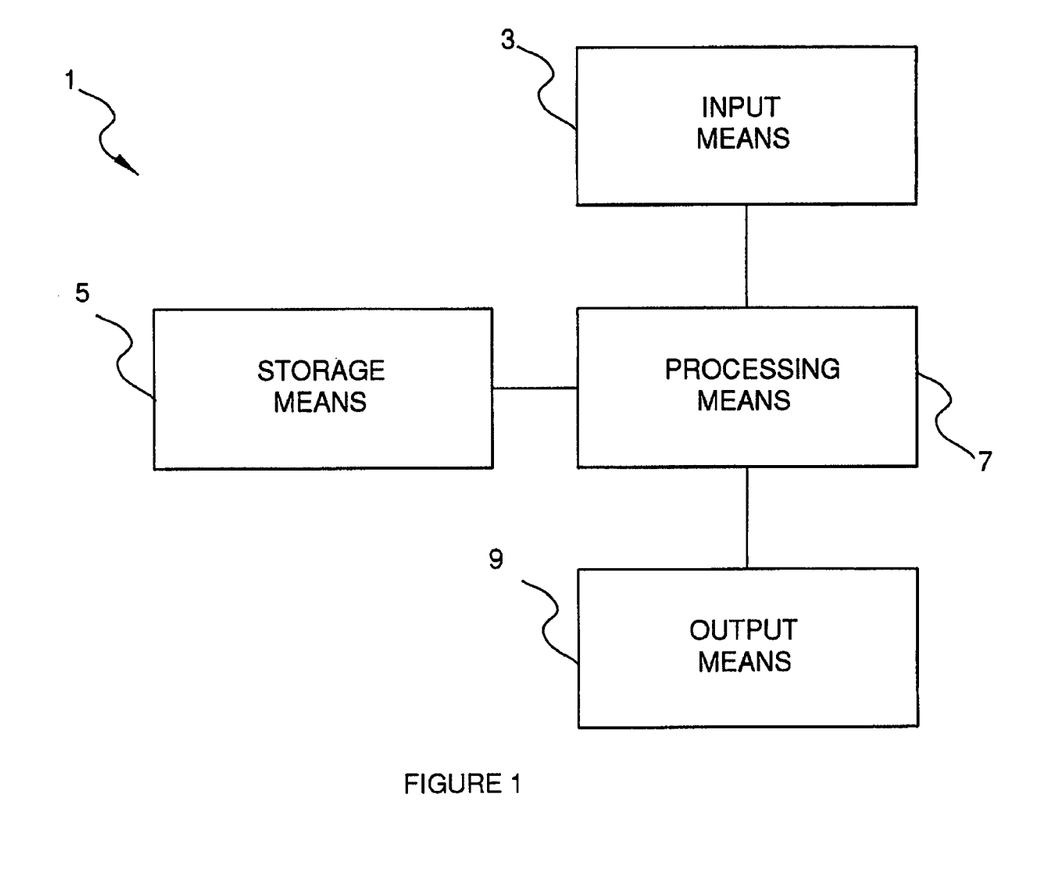
FIG. 1 illustrates an apparatus for assisting a user in determining a level of confidence in a risk assessment according to the embodiment of the present invention.

As can be seen in FIG. 1, the embodiment of the apparatus 1 for assisting a user in determining a level of confidence in a risk assessment comprises: an input means 3; storage means 5; processing means 7; and output means 9.

The apparatus 1 is in the form of a computer. The input means 3 is in the form of software which when run on the apparatus 1 effects display of a graphical user interface (GUI) on a visual display of the apparatus 1. The graphical user interface of the input means 3 is arranged to allow the user to enter a set of factors, each of which can effect a level of reliability in the risk assessment.

The set of factors entered into the input means 3 comprises: information about the environment of the risk assessment; information about the technique used to obtain the risk assessment; information about an extent to which the technique is used to obtain the risk assessment; and information about a level of acceptance of the technique and the extent to which the technique is used.

The information about the technique describes the technique employed to arrive at the risk assessment. For example, it describes the fact that the risk assessment was derived from either a personal assessment or by using a more formal technique such as statistical analysis to obtain the risk assessment. With regard to the extent to which the technique is used to obtain the risk assessment, this describes, for example, the number of samples on which the technique of statistical analysis was applied. The level of acceptance describes the number of people who accept the technique applied to the extent it is claimed to be applied. Finally, the information about the environment describes the environment in which risk assessment is applicable. For instance, where the environment can be readily controlled (for example, a manufacturing environment) the environment is described as being relatively simple. In contrast, where the environment relates to the share market, in which there are many variables that can not be controlled or easily predicted, the environment is described as being highly complex.

Thus, the input means 3 (which as mentioned previously, displays a graphical user interface) allows the user to enter, for example, the fact that the risk assessment was calculated using statistical analysis and that the environment is highly complex The storage means 5 is in the form of a computer storage medium, and in particular is a database such as that available from Oracle. The storage means 5 stores a record containing a plurality of factors that can influence the reliability of the risk assessment. The storage means 5 also stores a plurality of weightings that are associated with the factors stored in the storage means 5. Essentially, each of the plurality of weightings represents a level of confidence in the risk assessment in relation to particular weightings.

Figure 3:
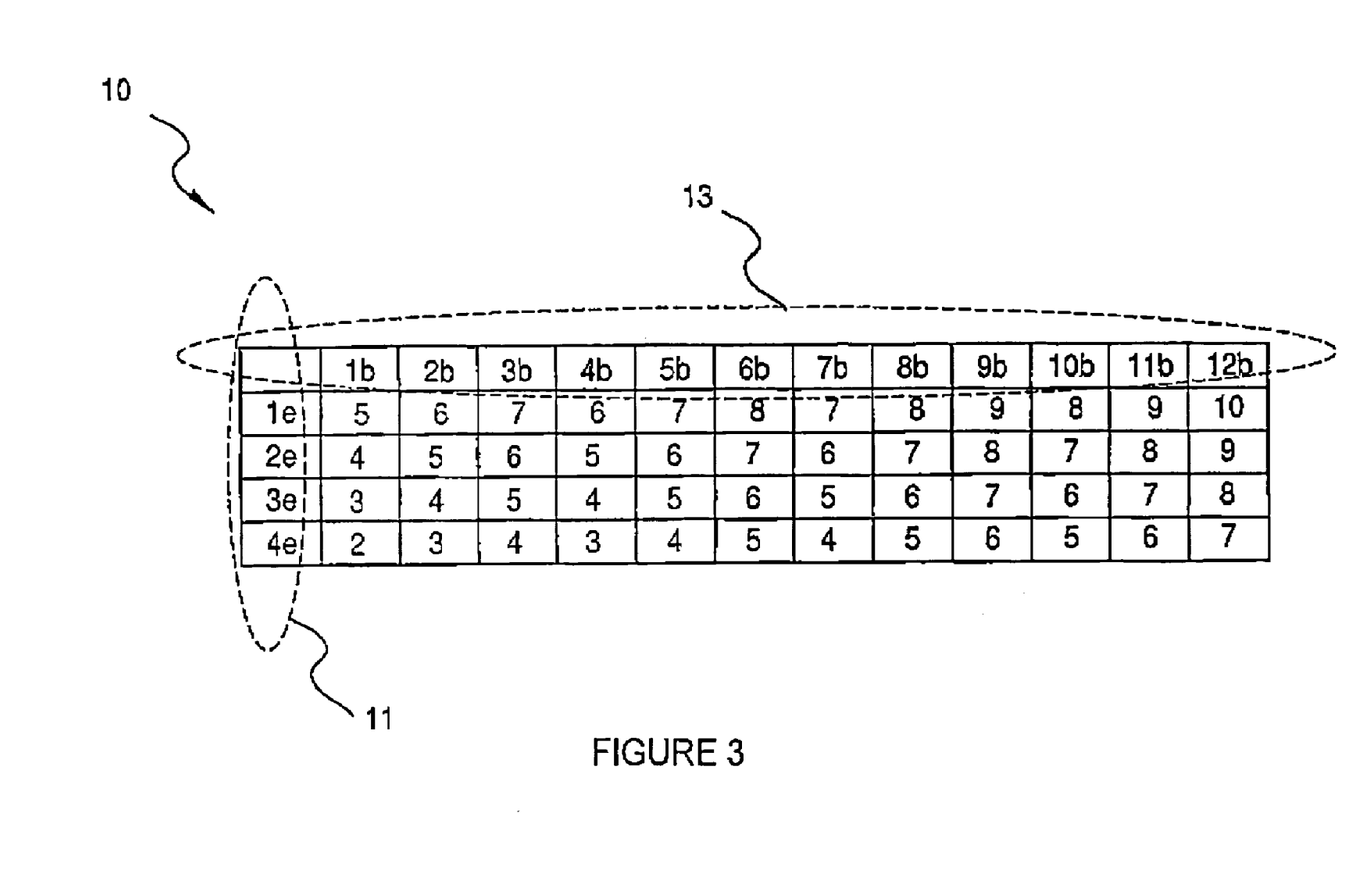
FIG. 3 illustrates a matrix stored in the storage means shown in FIG. 1.

More specifically, the factors and weightings are arranged as a matrix 10 (see FIG. 3). The weightings in the record are entries in the matrix 10, whilst the factors in the record act as an index 11 and 13 to the entries in the matrix 10.

Figure 4:
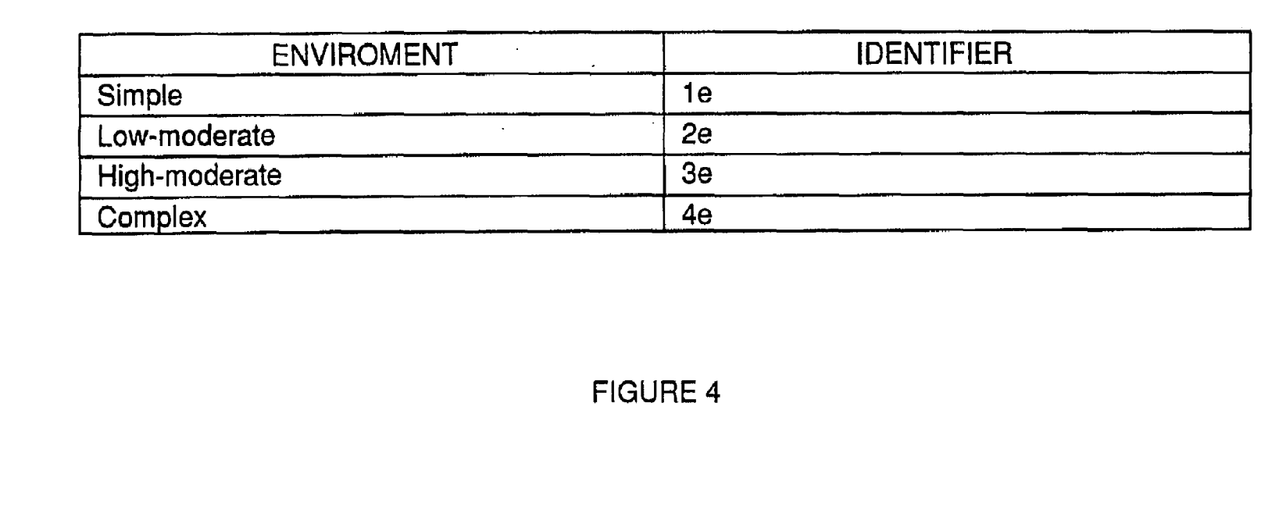
FIG. 4 shows a table mapping sub-factors forming the environment factor stored in the storage means illustrated in FIG. 1.
Figure 5:
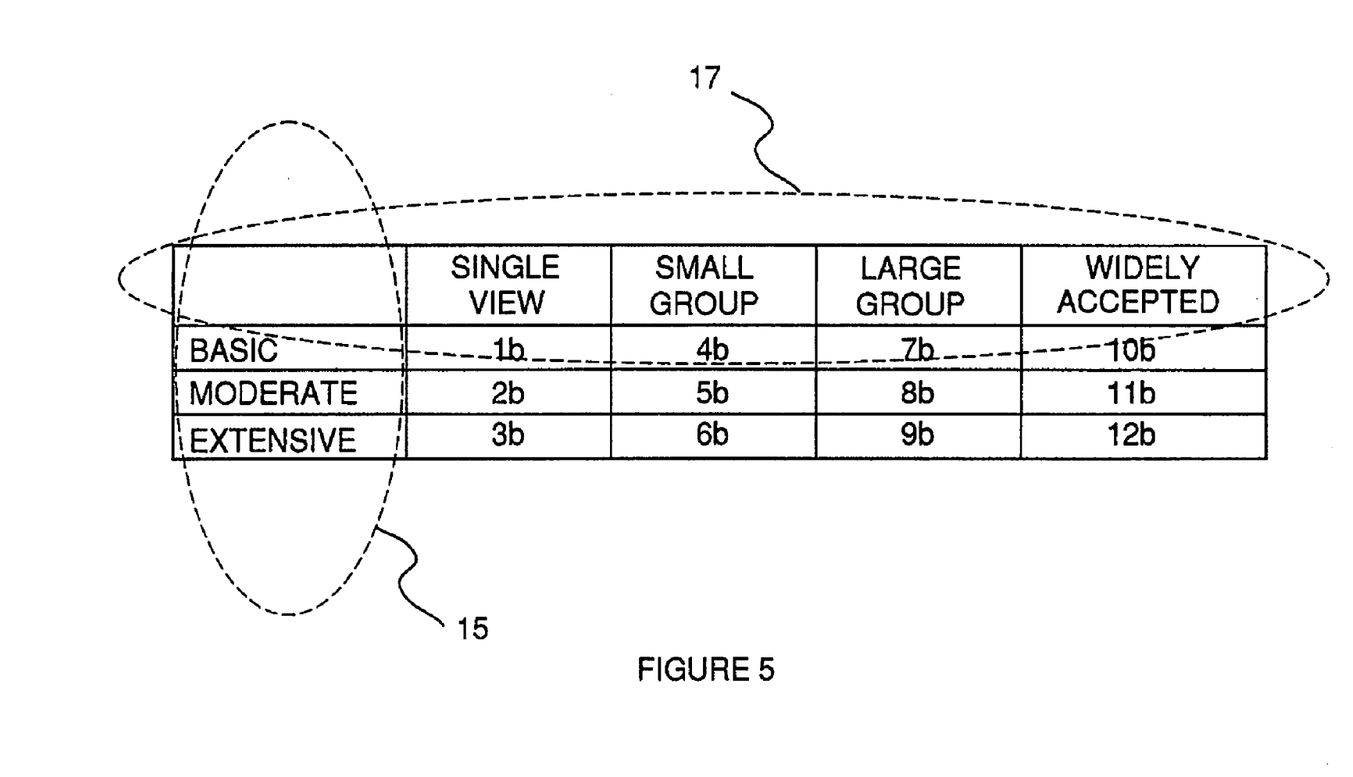
FIG. 5 shows a matrix used to derive the indexes shown in the table of FIG. 4.

Each of the indexes 11 represent an environment in which the risk assessment was made, and is divided into a number of different levels. The symbols 1e-4e of the matrix 10 in FIG. 3 are a convenient means for representing each of the different levels of the environment. The mapping of the symbols to the different levels of the environment is shown in FIG. 4. The indexes 13 of the matrix 10 in FIG. 3 are derived from another matrix 14 which is shown in FIG. 5. The matrix 14 also has indexes 15 and 17, and entries which are the symbols (1b-12b) used as the indexes 13 in the matrix 10 of FIG. 3. The indexes 15 represent the extent of work performed by the technique to derive the risk assessment. As can be seen in FIG. 5, the extent of the work performed is divided into a number of different levels, which include: basic, moderate, and extensive. As an example, if statistical analysis is used to derive the risk assessment and only a small number of samples are used, then the level of work performed is considered "basic". However, if a large number of samples were used then the level of work performed would be considered as "extensive".

The indexes 17 represent a level of acceptance of the technique and extent to which the technique is used to calculate the risk assessment. As can be seen in FIG. 5, the indexes 17 are divided into a number of different levels, which comprise: single view; small group validation; large group validation; and widely accepted. Thus, by using the matrix 14 illustrated in FIG. 5 one can readily determine what the symbols 13 in FIG. 3 represent. For example, the symbol 6b in the matrix 10 of FIG. 3 represents that extensive work was performed in obtaining the risk assessment, and that the technique employed to obtain the risk assessment is considered acceptable by a small group of people.

Figure 7:
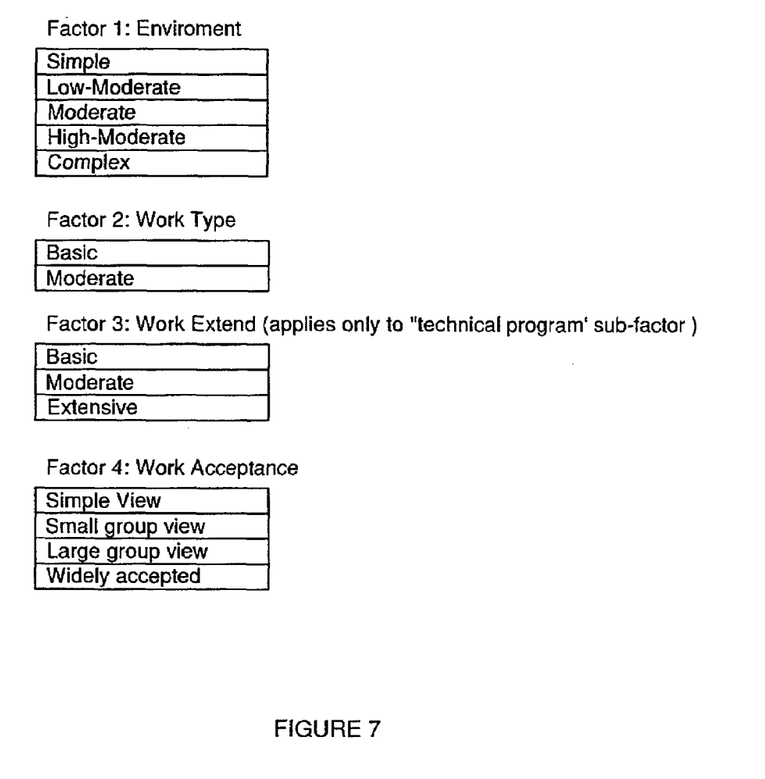
FIG. 7 shows information related to factors that can be entered into the system of FIG. 1.
Figure 8:
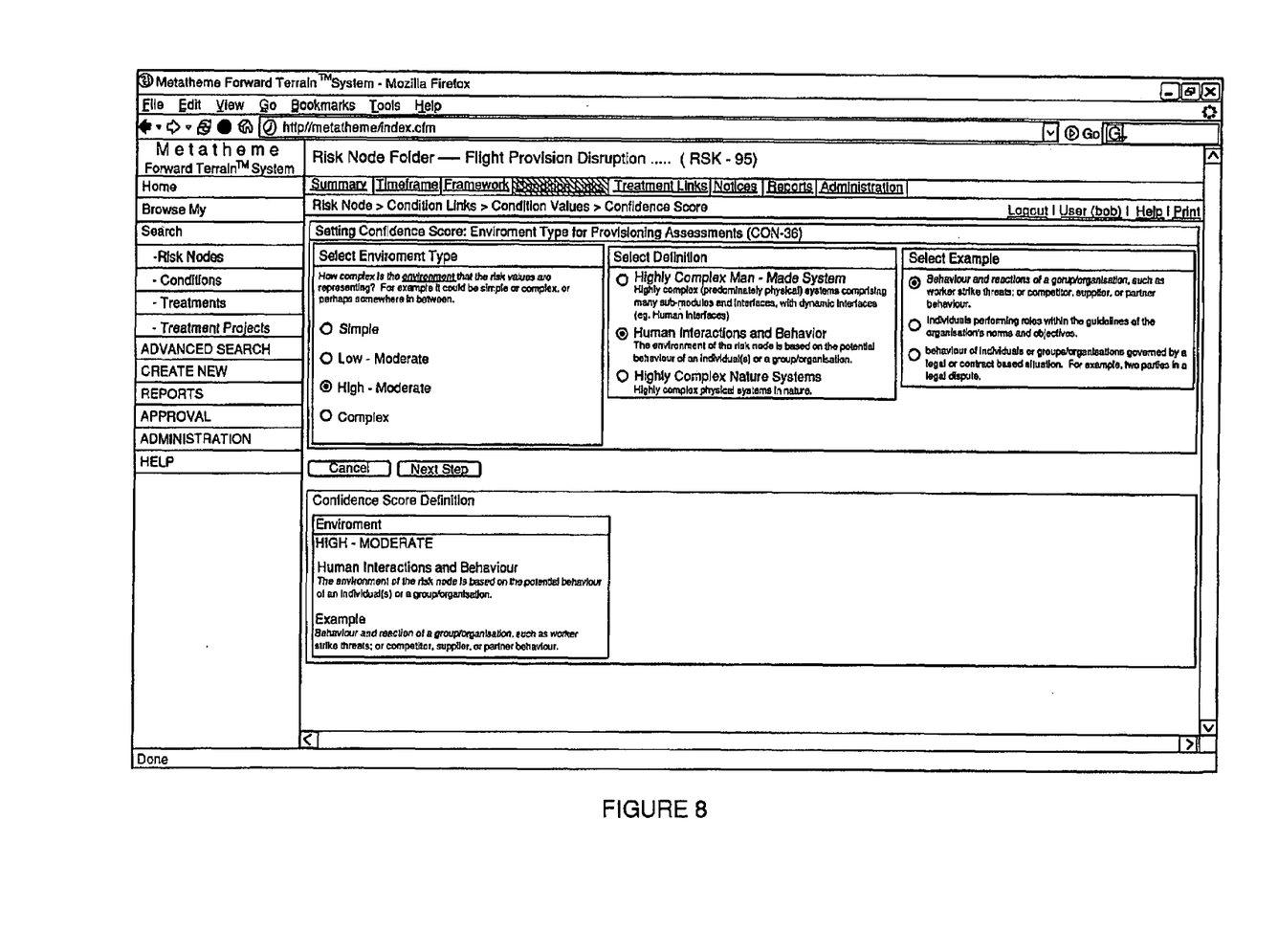
FIGS. 8 to 11 shows several images of the graphical user interface displayed by the system of FIG. 1.
Figure 9:
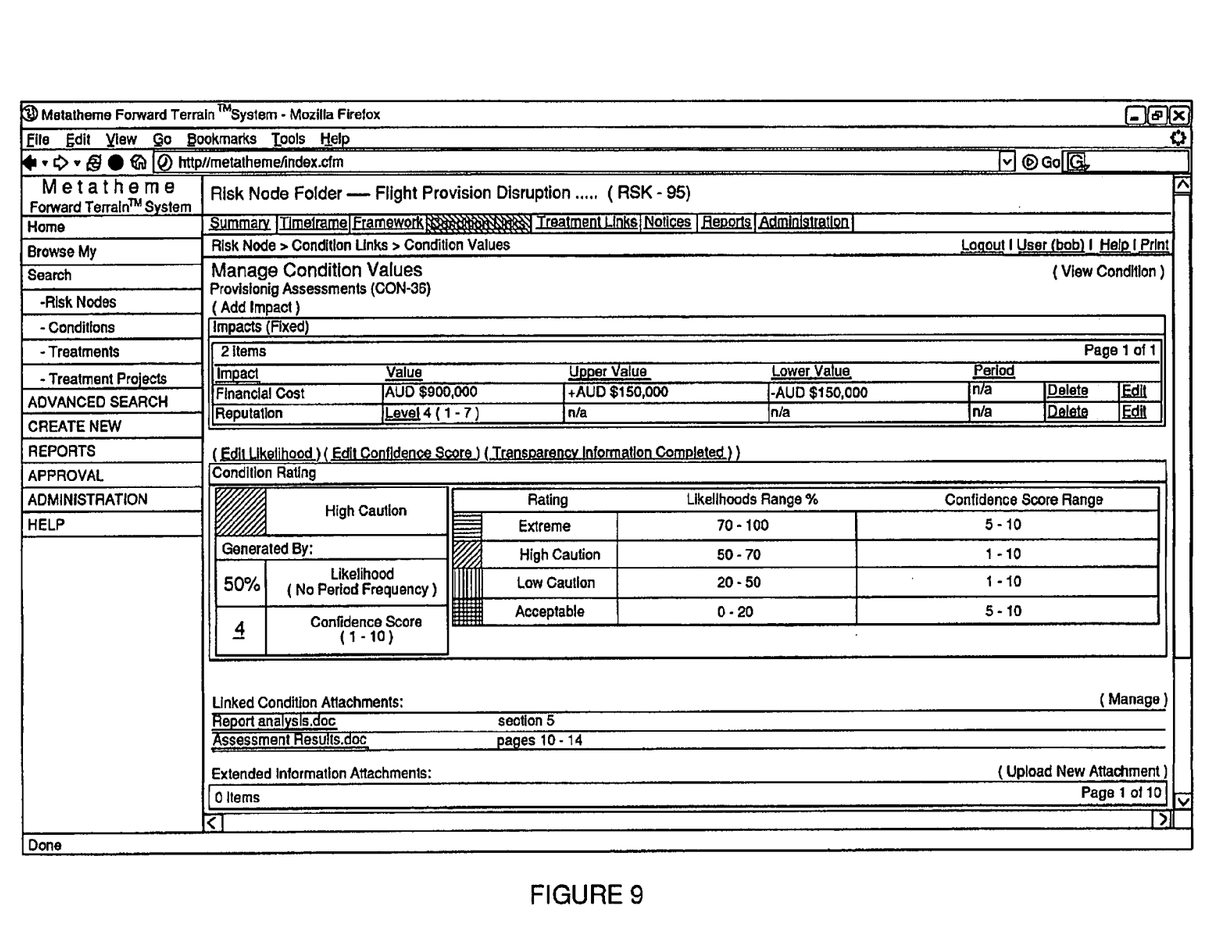
Figure 10:
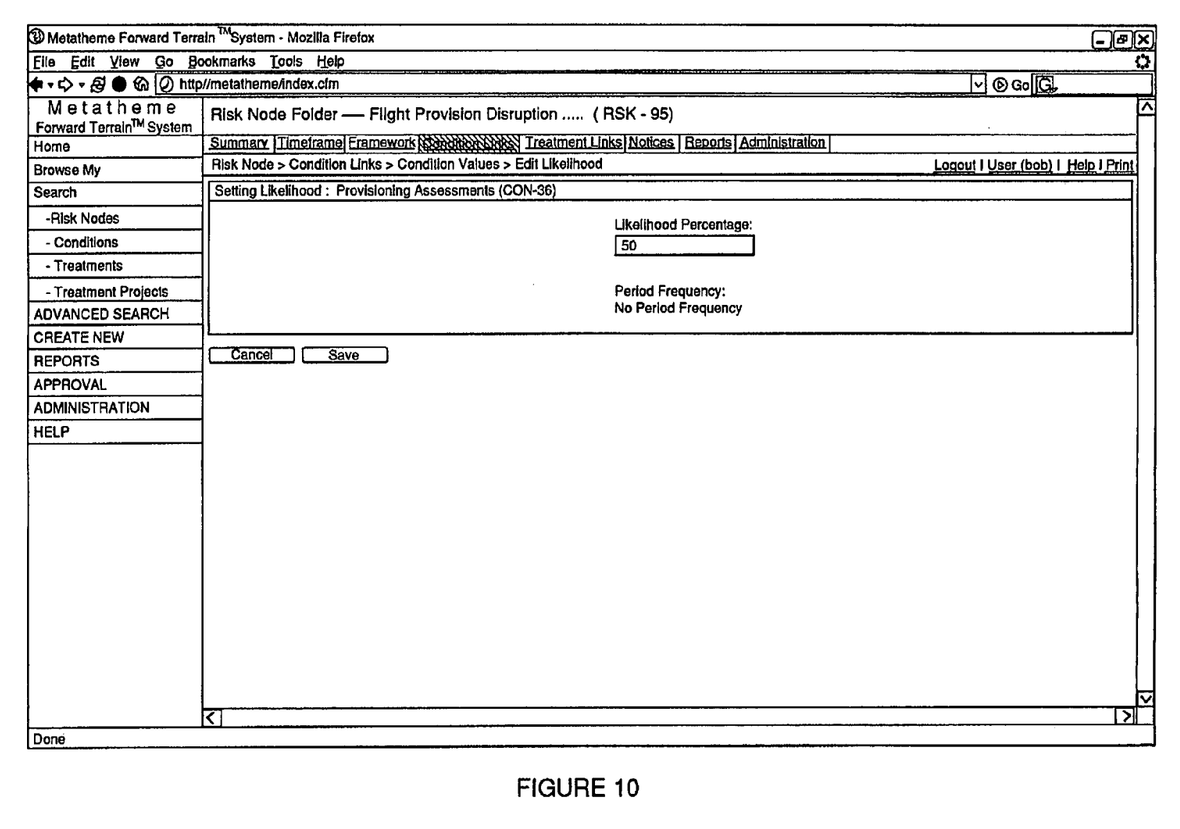
Figure 11:
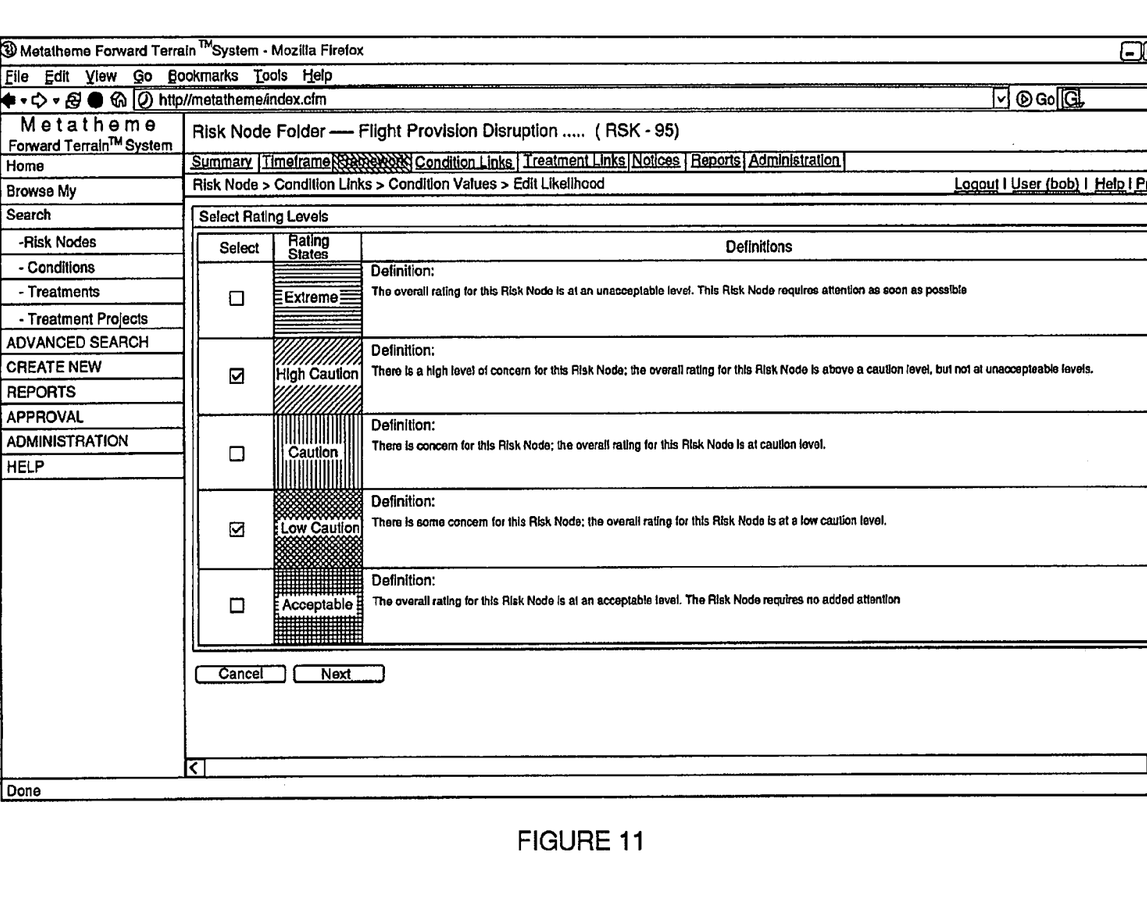

The user of the apparatus 1 is required to enter into the input means 3 the following factors: the environment; the level of acceptance of the technique and extent to which the technique is used to obtain the risk assessment, and the extent of work performed by the technique. More specifically, the user would enter the level of the factors applicable to the risk assessment. For example, if the environment was complex, the user would enter "complex" into the input means 3. A summary of the various levels of the factors entered into the input mean 3 is provided in FIG. 7.

Once the level of the factors have been entered into the input means 3, the processing means 7 proceeds to process the factors entered into the input means 3 and the matrix 10 in order to identify the indexes 11 and 13 which match the factors entered into the input means 3. For example, if the factors entered into the input means 3 where a "high-moderate" environment with "extensive" use of a technique which is accepted by a "large group", then the processing means 7 would identify the symbols "3e" and "9b". The symbol "3e" being derived from the table shown in FIG. 4, whilst the symbol "9b" is obtained from the matrix 14 shown in FIG. 5. Once the processing means 7 has determined the appropriate symbols, it proceeds to identify the equivalent indexes 11 and 13 in the matrix 10 of FIG. 3.

It is noted that the processing means 7 is in the form of software that is executed by the apparatus 1.

Once the processing means 7 has identified the appropriate indexes 11 and 13, the output means 9 proceeds to retrieve the weighting which is located at the intersection of the index 11 and 13 which have been identified by the processing means 7. In the case of the example given in the above paragraph, the intersection of 3e and 9b is a weighting of "7". The retrieved weighting factor along with the range of weighting factors in the matrix 10 (that is, 2-10) is then output by the output means 9. By outputting the weighting "7" and the range "2-10" the user is able to put the weighting into context. In the case of the given example, one can see that "7" rates relatively highly of the range of "2-10". Thus, assuming 10 represents a high level of confidence in the risk assessment and 2 represents a low level of confidence in the risk assessment, one can safely say that the weighting of "7" rates relatively highly on the range of "2-10". Consequently, a risk assessment of "7" means that the user can have a reasonable level of confidence in the risk assessment.

It is noted the output means 9 is in the form of software that runs on the apparatus 1, and which effects display of a graphical user interface on the visual display of the apparatus 1.

In the present embodiment, the matrix 14 and the table illustrated in FIG. 4 are defined by a user of the apparatus 1. The input means 3 allows the user to define the matrix 14 and the table via the graphical user interface. Similarly, the entries in the matrix 10 are defined by the user via the graphical user interface of the input means 3.

Figure 2:
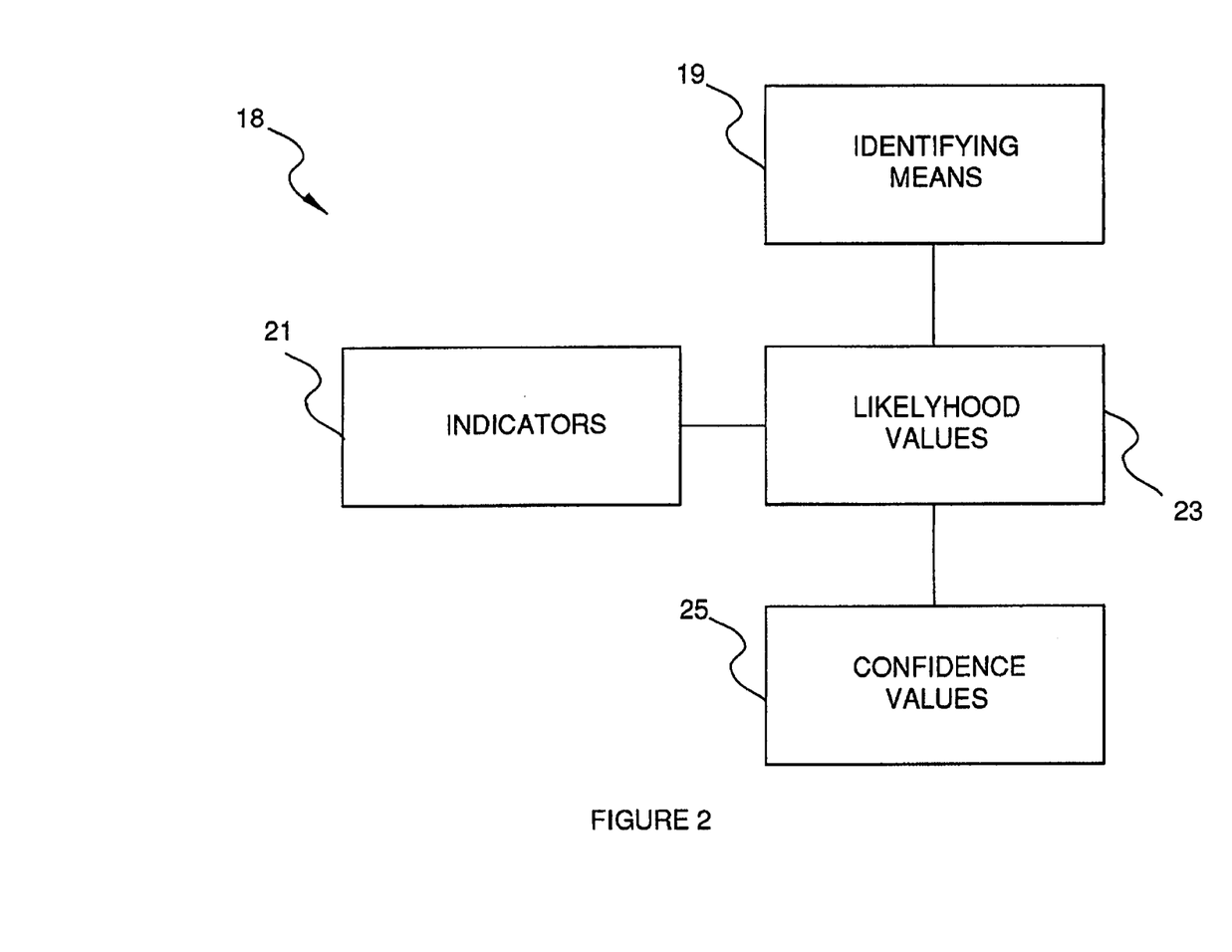
FIG. 2 illustrates an apparatus for assisting a user in determining the acceptability of an event occurring according to the embodiment of the present invention.

In addition to assisting a user to determine a level of confidence in the risk assessment, the apparatus 1 also enables the user to determine a level of acceptability of an event occurring. In this regard, the apparatus 1 also comprises an identifying means 19. The input means 13 is such that it enables the user to enter a likelihood value which represents a likelihood that the event will occur, and a confidence value which represents a level of confidence that the user has in the likelihood value.

The likelihood and confidence values entered into the input means 3 are in the form of a probability value (for example, 0.2%) and integer value (for example 3), respectively.

The storage means 5 is such that it stores a plurality of records, each of which comprises an indicator representing a level of acceptability of the event occurring. The record also comprises a range of likelihood values and a range of the confidence values.

The indicators in the storage means 5 are visual indicators, each of which is a different colour or symbol. Where, for example, the indicator represents a very low level of acceptability, the relative indicator is the colour red, whilst a high level of acceptability is represented by the colour green. Where an indicator represents a medium level of acceptability, the indicator is orange in colour.

The range of likelihood values in each record is essentially a different range of likelihood values. For example, a first record can have the range of <0.5%, a second record can have the range 0.5%-1.05% and a third record can have the record >1.05%. The range of confidence values are ranges of confidence values (which are integers), such as 8-10, 5-10 and 1-10.

Figure 6:
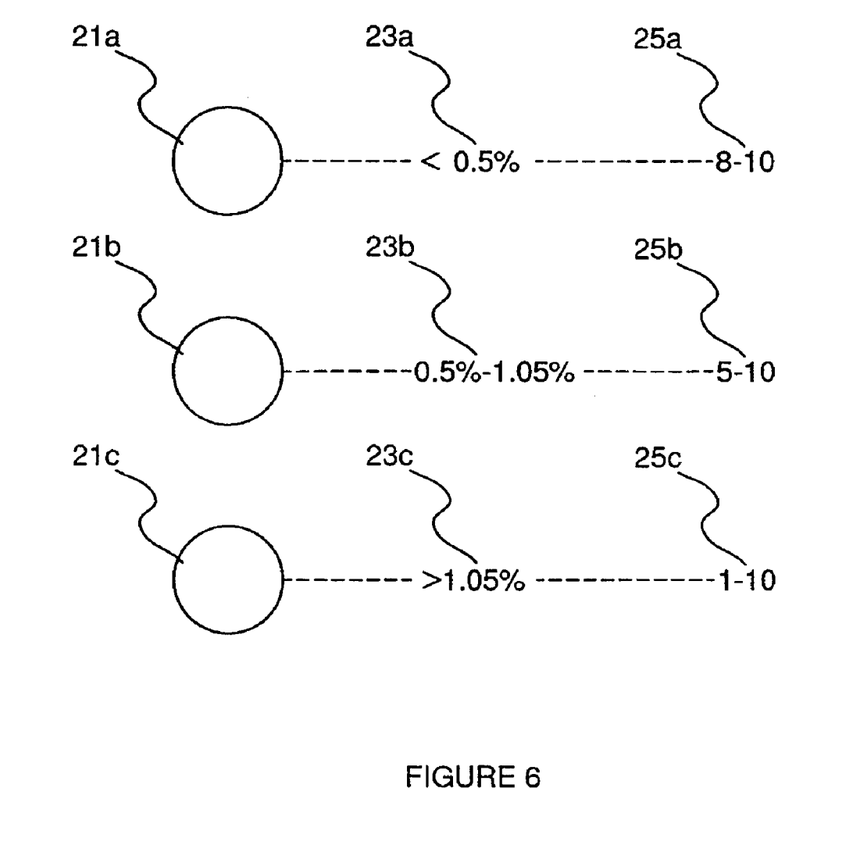
FIG. 6 shows information stored in the storage means illustrated in FIG. 2.

FIG. 6 provides a conceptual diagram of the records that are stored in the storage means 5. With reference to FIG. 6, the indicators are marked 21, the ranges of likelihood values are marked as 23 and the ranges of confidence values are marked as 25. Once the likelihood value and confidence value have been received by the input means 3, the identify means 19 proceeds to process the received likelihood and confidence values and the ranges of likelihood values and the ranges of confidence values in each of the records in order to identify one of the records. The identifying means 19 is in the form of software that runs on the apparatus 1.

The range of confidence values of the record identified by the identifying means 19 comprises the confidence value received by the input means 3, and the range of likelihood values of the record identified by the identifying means 19 either comprises the likelihood value received by the input means 3 or is numerically closer to the likelihood value received by the input means 3 than the range of likelihood values of any other of the records.

For example, where the input means 3 receives a likelihood value of 0.55% and a confidence value of 4, the identifying means 19 identifies the bottom record (of FIG. 6); that is, the record having a likelihood range of >1.05% and a confidence range of 1-10.

After the identifying means 19 has identified a record, the output means 9, which is in the form of software that effects a display of a graphical user interface on the monitor of the apparatus 1, retrieves the indicator from the identified record and displays it to the user via the graphical user interface. Thereby assisting the user is assessing the acceptability of the risk assessment.

The input means 3 is also configured to allow the user to enter and/or change the range of values and/or range of confidence values in the records. This is provided for via the graphical user interface of the output means. The input means 3 also allow the number of indicators to be changed.

With regard to FIGS. 8 to 11, these figures represent the graphical user interfaces that enables the user to enter information (e.g. factors) into the system 1, and display information to the user, (e.g. weightings).

Those skilled in the art will appreciate that the invention described herein is susceptible to variations and modifications other than those specifically described. It should be understood that the invention includes all such variations and modifications which fall within the spirit and scope of the invention.

The invention claimed is:

1. An apparatus configured for assisting a user in determining a level of acceptability of an event occurring, the apparatus comprising:
    an input for receiving a likelihood value which represents a likelihood that the event will occur, and a confidence value which represents a level of confidence that the user has in the likelihood value;
    a storage for storing a plurality of records, a range of likelihood values, and a range of confidence values;
    an indicator assignor to assign a representative indicator to each of the plurality of records, each repective indicator representing a level of acceptability of the event occurring;
    an identifer configured for identiflying one of the records in the store, the one of the records being identified by processing the likelihood value and the confidence value received by the input means, and each of the records stored in the store; and
    an output configured for outputting the assigned indicator of the one of the record identified by the identifying.

2. The apparatus as claimed in claim 1, wherein for a subsequent input of a confidence value and a likelihood value of an event where a level of acceptability is to be determined, said identifier is configured to find a match of one or more stored records where the confidence values embrace the confidence value of the subsequent input, and to then from stored records of such match find a match of a single record where the likelihood values embrace the likelihood value of the subsequent input, and outputting the assigned indicator for a matched single record, or if the likelihood values do not embrace the likelihood value of the subsequent input, then a single stored record is identified where the likelihood value of the subsequent input is numerically closest to the likelihood values, and outputting the assigned indicator for that identified single record.

3. The apparatus as claimed in claim 2, wherein the respective indicator in each of the records is a respective visual indicator each being a different color or symbol.

4. The apparatus as claimed in claim 3, wherein the range of likelihood values in each of the records comprises a range of probability values.

5. The apparatus as claimed in claim 4, wherein the range of confidence values in each of the records comprises a range of integers.

6. The apparatus as claimed in claim 5, wherein the input means is configured to allow the user to enter and/or change the range of likelihood values and/or range of confidence values in each of the records.

7. The apparatus as claimed in claim 6, wherein the input comprises a graphical user interface.

8. The apparatus as claimed in claim 7, wherein the store comprises a computer storage medium.

9. The apparatus as claimed in claim 8, wherein the computer storage medium comprises a database.

10. The apparatus as claimed in claim 9, wherein the identifier comprises a suitably configured computer.

11. The apparatus as claimed in claim 10, wherein the output comprises a graphical user interface.

12. A method for assisting a user in determining a level of acceptability of an event occurring, the method comprising the steps of:
    receiving a likelihood value which represents a likelihood that the event will occur, and a confidence value which represents a level of confidence that the user has in the likelihood value;
    storing a plurality of records each of which includes an indicator representing a level of acceptability of the event occurring, a range of likelihood values, and a range of confidence values;
    identifying one of the records stored by the storing step, the one of the records being identified by processing the likelihood value and the confidence value received by the receiving step, and each of the records stored by the storing step; and
    outputting the indicator of the one of the records identified by the identifying step.

13. The method as claimed in claim 12, wherein for a subsequent input of a confidence value and a likelihood value of an event where a level of acceptability is to be determined, using said identifier to find a match of one or more stored records where the confidence values embrace the confidence value of the subsequent input, and to then from stored records of such match find a match of a single record where the likelihood values embrace the likelihood value of the subsequent input, and outputting the assigned indicator for a matched single record, or if the likelihood values do not embrace the likelihood value of the subsequent input, then identifying a single stored record where the likelihood value of the subsequent input is numerically closest to the likelihood values, and outputting the assigned indicator for that identified single record.

14. The method as claimed in claim 13, further comprising the step of entering and/or changing the range of likelihood values and/or range of confidence values in each of the records.

15. An apparatus for determining a level of confidence in a risk assessment, the apparatus comprising:
    obtaining means operable to obtain a weighting that is associated with at least one of a plurality of factors that can influence a reliability of the risk assessment; and
    comparing means operable to compare the weighting to a range of weightings which are associated with the factors in order to determine the level of confidence in the risk assessment;
    wherein the obtaining means is such that it uses the at least one of the factors to retrieve the weighting from a record of the weightings and is operable to retrieve the weighting from the record by using a first index and a second index to retrieve the weighting from the record, wherein the first index corresponds to a first of the at least one of the factors, and the second index corresponds to a second and a third of the at least one of the factors;

and wherein the first of the at least one of the factors relates to an environmental parameter associated with the risk assessment, the second of the at least one of the factors relates to an amount of work performed to determine the risk assessment, and the third of the at least one of the factors relates to a level of acceptance associated with the amount of work performed and a technique used to perform the work.

16. The apparatus as claimed in claim 15 wherein the record comprises a matrix that contains an entry for each of the weightings, and the first index and the second index correspond to an x, y coordinate for the entry.

17. A method of determining a level of confidence in a risk assessment, the method comprising the steps of:
obtaining a weighting that is associated with at least one of a plurality of factors that can influence a reliability of the risk assessment; and
comparing the weighting to a range of weightings which are associated with the factors in order to determine the level of confidence in the risk assessment;
wherein the step of obtaining the weighting comprises using the at least one of the factors to retrieve the weighting from a record of the weightings;
wherein the step of using the at least one of the factors to retrieve the weighting comprises the step of using a first index and a second index to retrieve the weighting from the record:
wherein the first index corresponds to a first of the at least one of the factors, and the second index corresponds to a second and a third of the at least one of the factors;
and wherein the first of the at least one of the factors relates to an environmental parameter associated with the risk assessment, the second of the at least one of the factors relates to an amount of work performed to determine the risk assessment, and the third of the at least one of the factors relates to a level of acceptance associated with the amount of work performed and a technique used to perform the work.

18. The method as claimed in claim 17, wherein the record comprises a matrix that contains an entry for each of the weightings, and the first index and the second index correspond to an x, y coordinate for the entry.

19. An apparatus for assisting a user in determining the level of confidence in a risk assessment, the apparatus comprising:
input means for receiving multiple factors upon which a risk is to be assessed;
storage means for storing the factors, and a set of weighting indicators therefor; said multiple factors being:
first factors which rate the environment context of the risk assessment;
second factors based on the extent of work performed to derive the risk assessment;
third factors which rate a level of acceptance of the extent of the work performed to derive the risk assessment;
processing means for:
processing the second and third factors to identify each possible combination of the second and third factors;
processing each identified combination of second and third factors, with first factors, to identify each possible combination of second and third factors, with first factors;
processing each possible combination of second and third factors, with first factors, to establish a weighting index for each possible combination of second and third factors, with first factors,
each weighting index representing a level of confidence in a risk assessment;
and output means for outputting a spread range of the set of weighting indexes, and the particular risk assessment corresponding to a combination of the factors used to establish the weighting index, whereby a confidence in the risk assessment is determinable by the relative position of the weighting index in the spread range of the indexes outputted.

20. An apparatus as claimed in claim 19, wherein the established weighting indexes are entries in a matrix of the possible combination of second and third factors, with first factors, and wherein second and third factors and first factors provide an index to the matrix.

21. An apparatus as claimed in claim 20, wherein the index to the entries in the matrix are divided into sub-factors.

22. An apparatus as claimed in claim 21, wherein sub-factors for the first factors are selected from: simple; low moderate; moderate; high moderate; and complex.

23. An apparatus as claimed in claim 22, wherein the input means allows a user to enter and/or change the factors and the weighting indicators.

24. An apparatus as claimed in claim 22, wherein input means allows the user to specify the spread range of the set of the weighting indexes.

25. An apparatus as claimed in claim 21, wherein the sub-factors for the second factors are selected from: basic; moderate; and extensive.

26. An apparatus as claimed in claim 25, wherein the input means allows a user to enter and/or change the factors and the weighting indicators.

27. An apparatus as claimed in claim 25, wherein the input means allows the user to specify the spread range of the set of the weighting indexes.

28. An apparatus as claimed in claim 21, wherein the sub-factors for the third factors are selected from: a single view; a small group; a large group; and widely accepted.

29. An apparatus as claimed in claim 28, wherein the input means allows the user to specify the spread range of the set of the weighting indexes.

30. A method of assisting a user in determining a level of confidence in a risk assessment, comprising:
entering into input means multiple factors upon which a risk is to be accessed;
storing the factors and a set of weighting indicators therefore;
said multiple factors being:
first factors which rate the environment context of the risk assessment;
second factors which based on the extent of work performed to derive the risk assessment;
third factors which rate the level of acceptance of the extent of the work performed to derive the risk assessment;
process second and third factors and identifying each possible combination of second and third factors,
identifying each possible combination of second and third factors with first factors,
establishing a weighting index for each identified possible combination of second and third with first factors, wherein each weighting index represents a level of confidence in a risk assessment within the set of weighting indicators, and determining a level of confidence by selecting factors which match a risk assessment, and noting the weighting index therefore and its relative position within the set of weighting indexes.

31. An apparatus as claimed in claim 30, wherein a matrix of entries is established of the weighting indexes, and wherein second and third factors, and first factors provide an index to the matrix.

32. An apparatus as claimed in claim 31, wherein the entries in the matrix are divided in sub-factors.

33. An apparatus as claimed in claim 32, wherein sub-factors for the first factors are selected from: simple; low; moderate; high moderate; and complex.

34. An apparatus as claimed in claim 32, wherein sub-factors for the second factors are selected from: basic, moderate, and extensive.

35. An apparatus as claimed in claim 32, wherein sub-factors for the third factors are selected from: a single view; a small group; a large group; and widely accepted.

36. An apparatus as claimed in claim 30, wherein a user changes the factors, and/or the weighting indicators.

37. An apparatus as claimed in claim 30 wherein a user specifies a spread range of the set of weighting indicators.

* * * * *